Jan. 18, 1927.
O. A. HOKANSON
1,614,475
POWER ACTUATED TYPEWRITER
Filed August 18, 1924   8 Sheets-Sheet 3
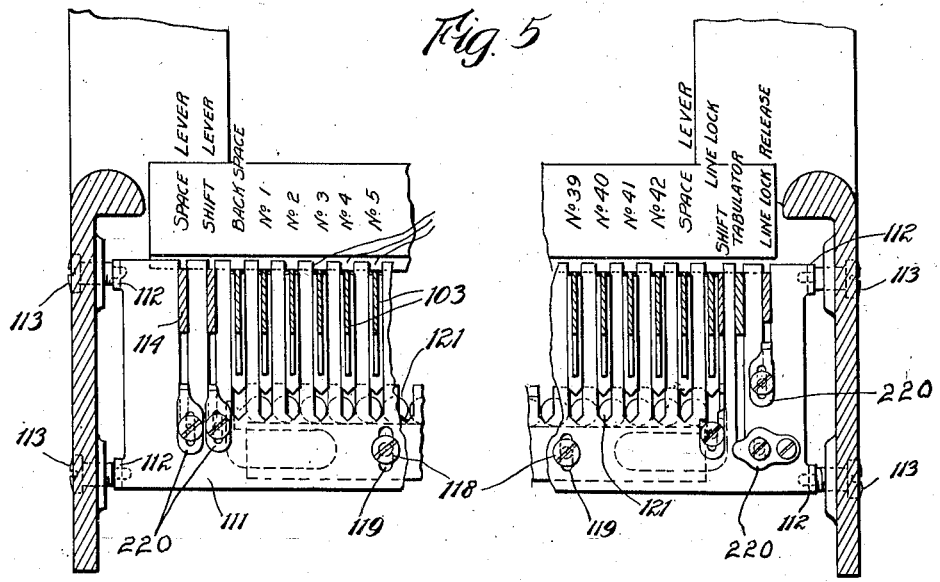
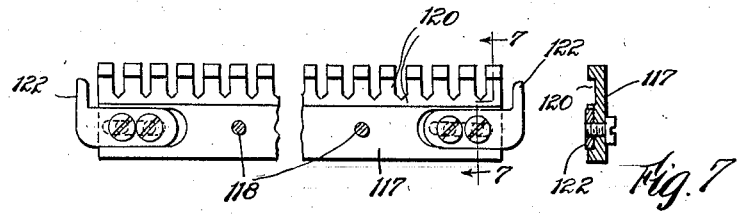
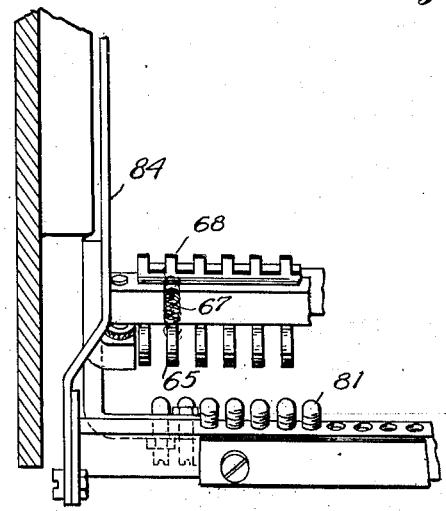
Inventor
Otto A. Hokanson
By Nissen Crane Attys Jan. 18, 1927.

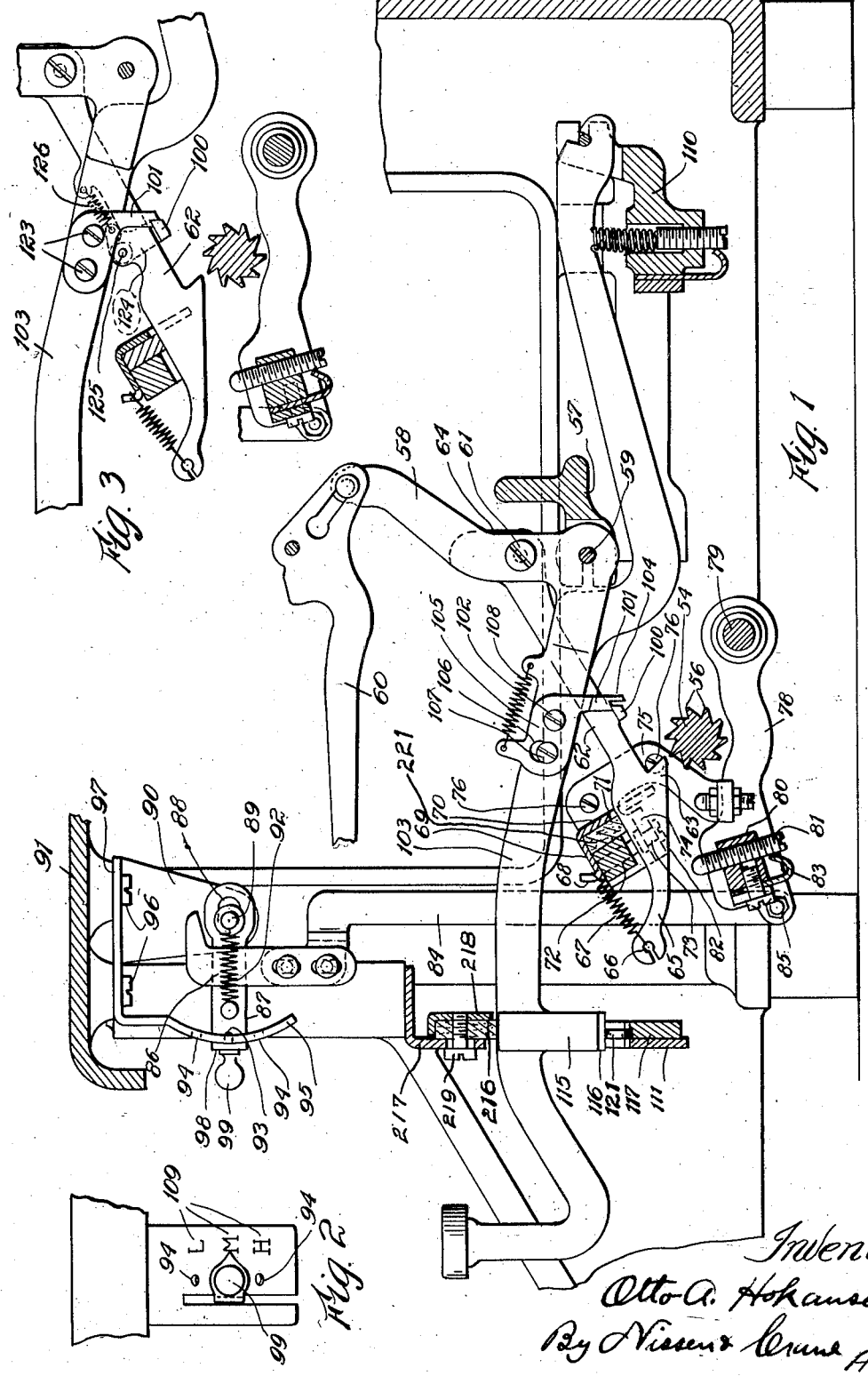

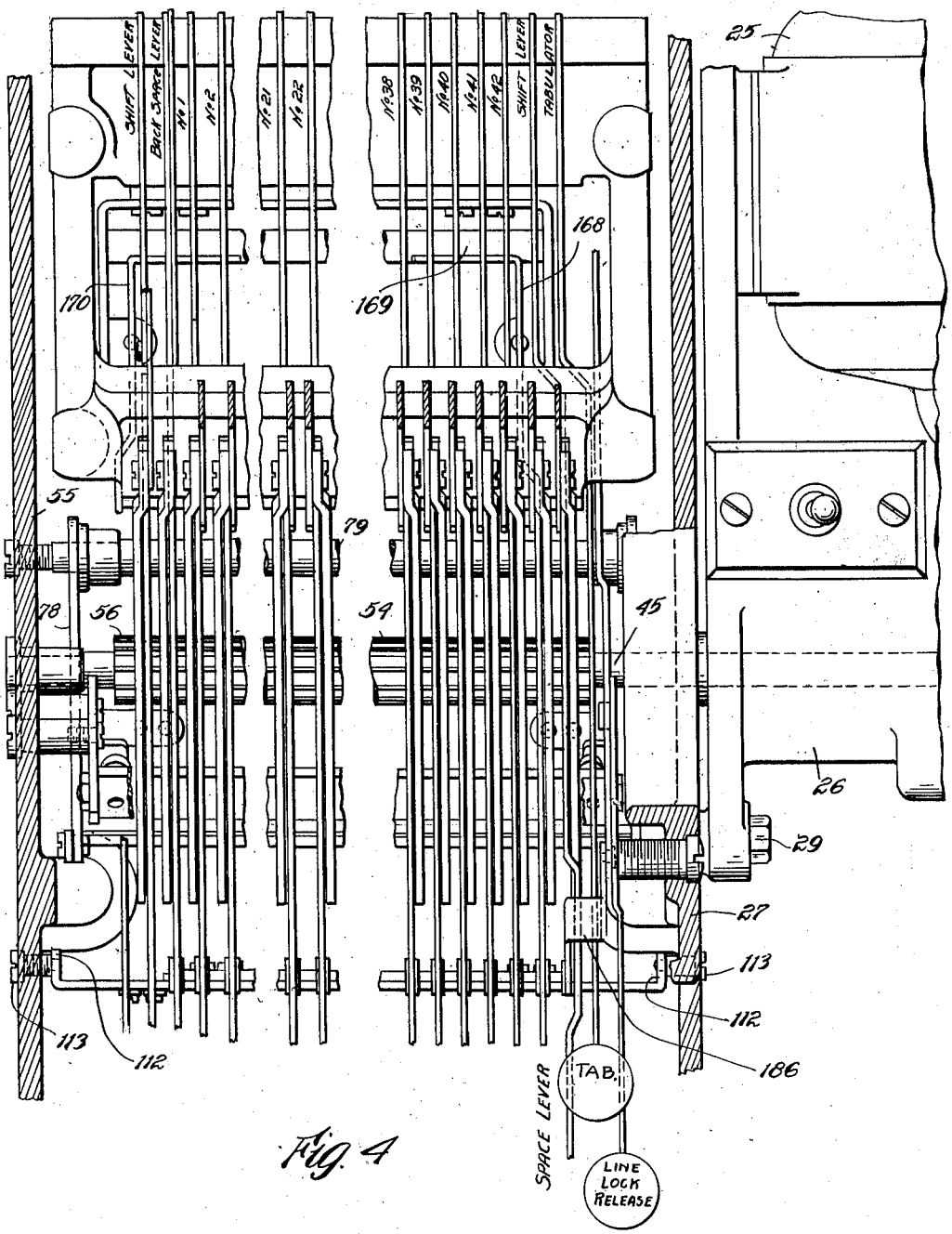

O. A. HOKANSON 1,614,475

POWER ACTUATED TYPEWRITER

Filed August 18, 1924    8 Sheets-Sheet 4

Inventor
Otto A. Hokanson
By Nissen & Crane
Attys

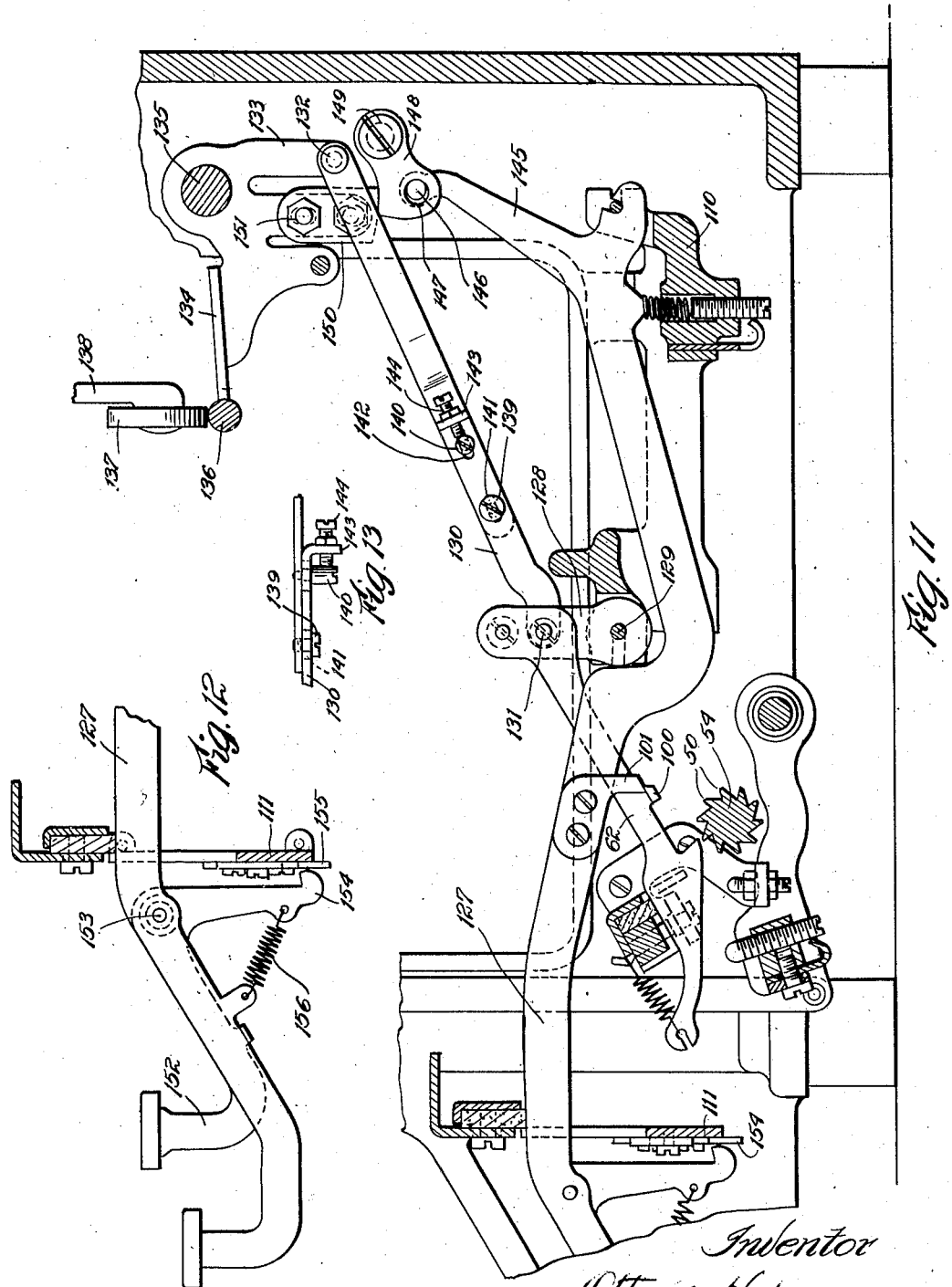

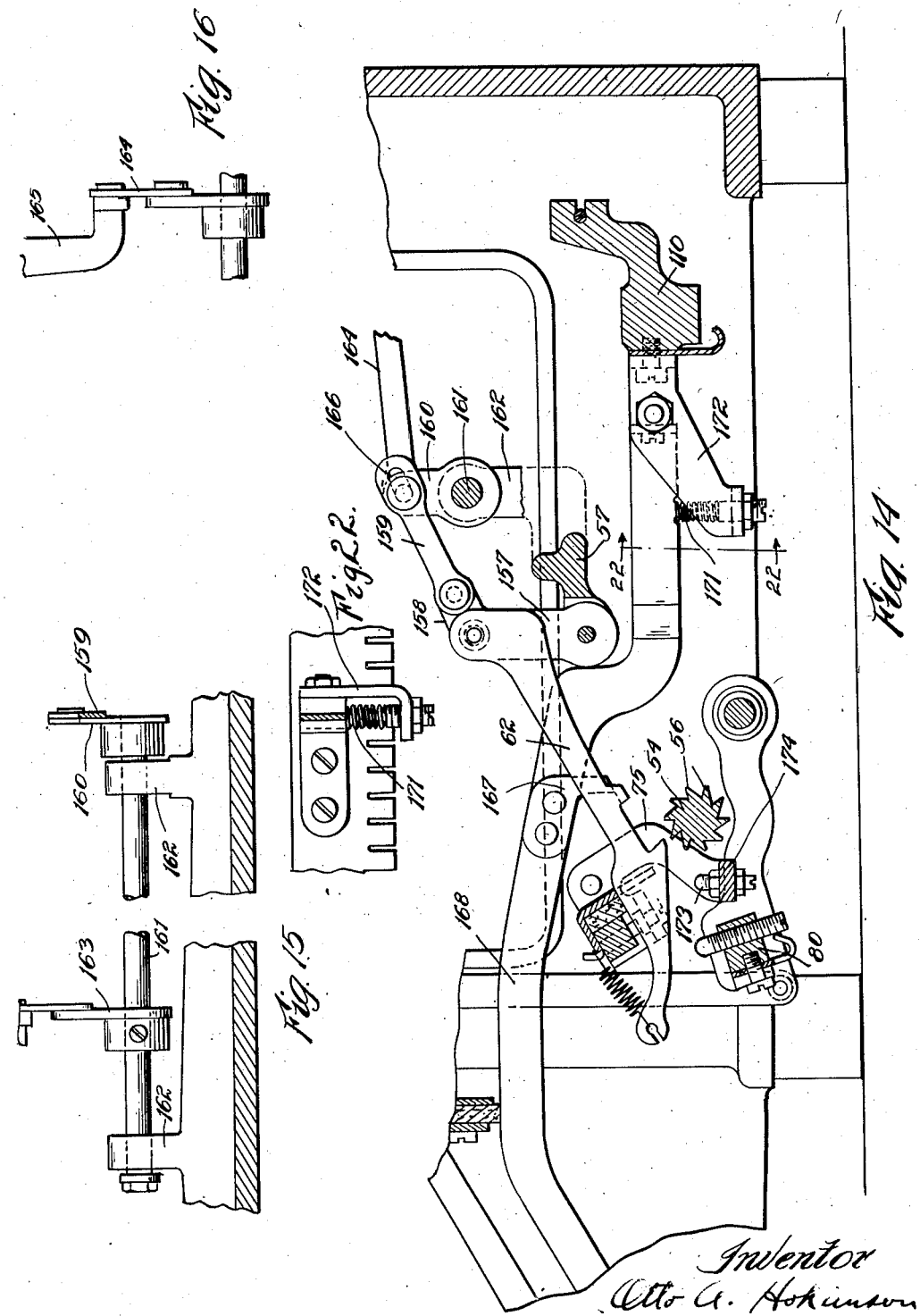

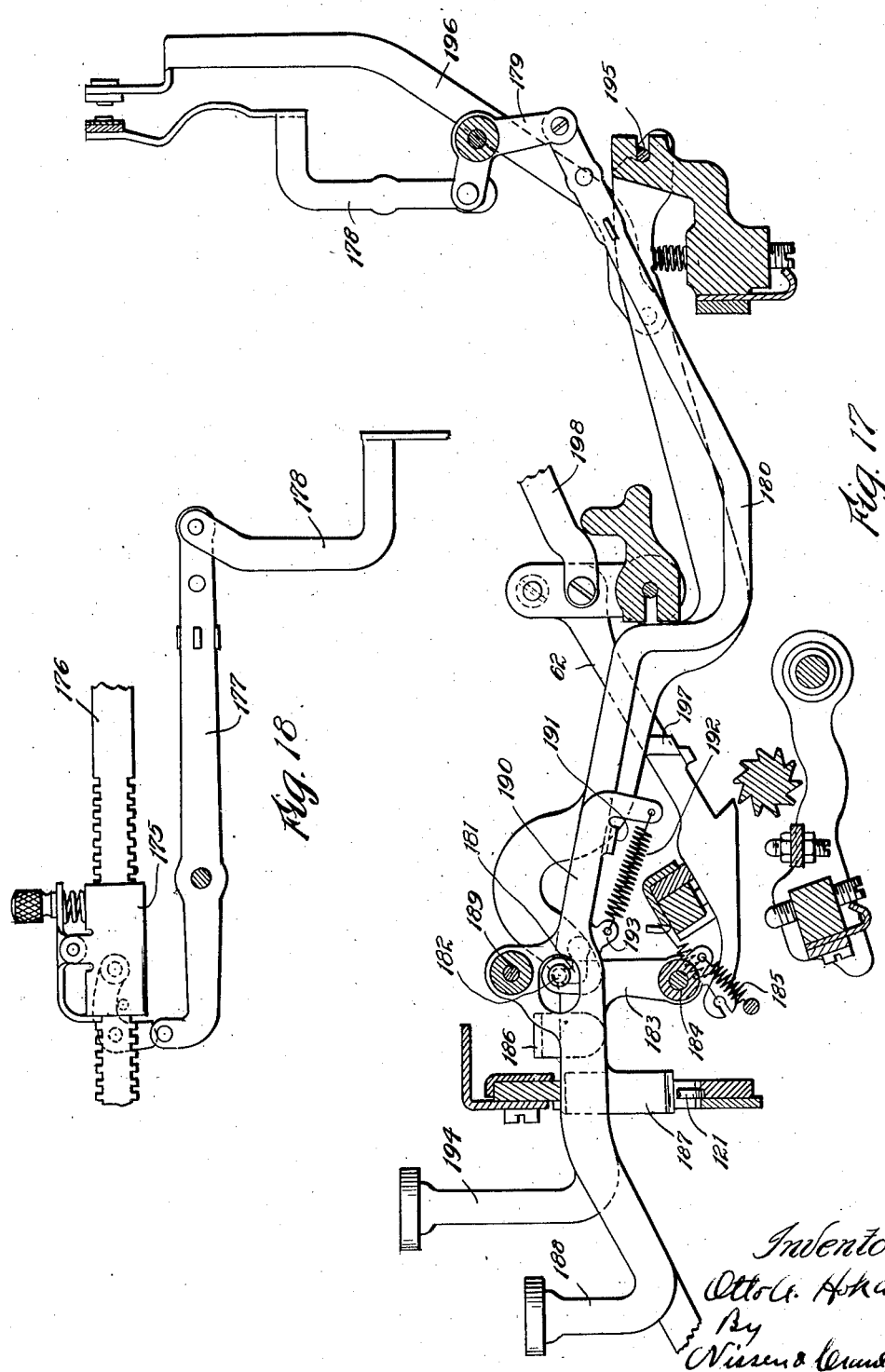

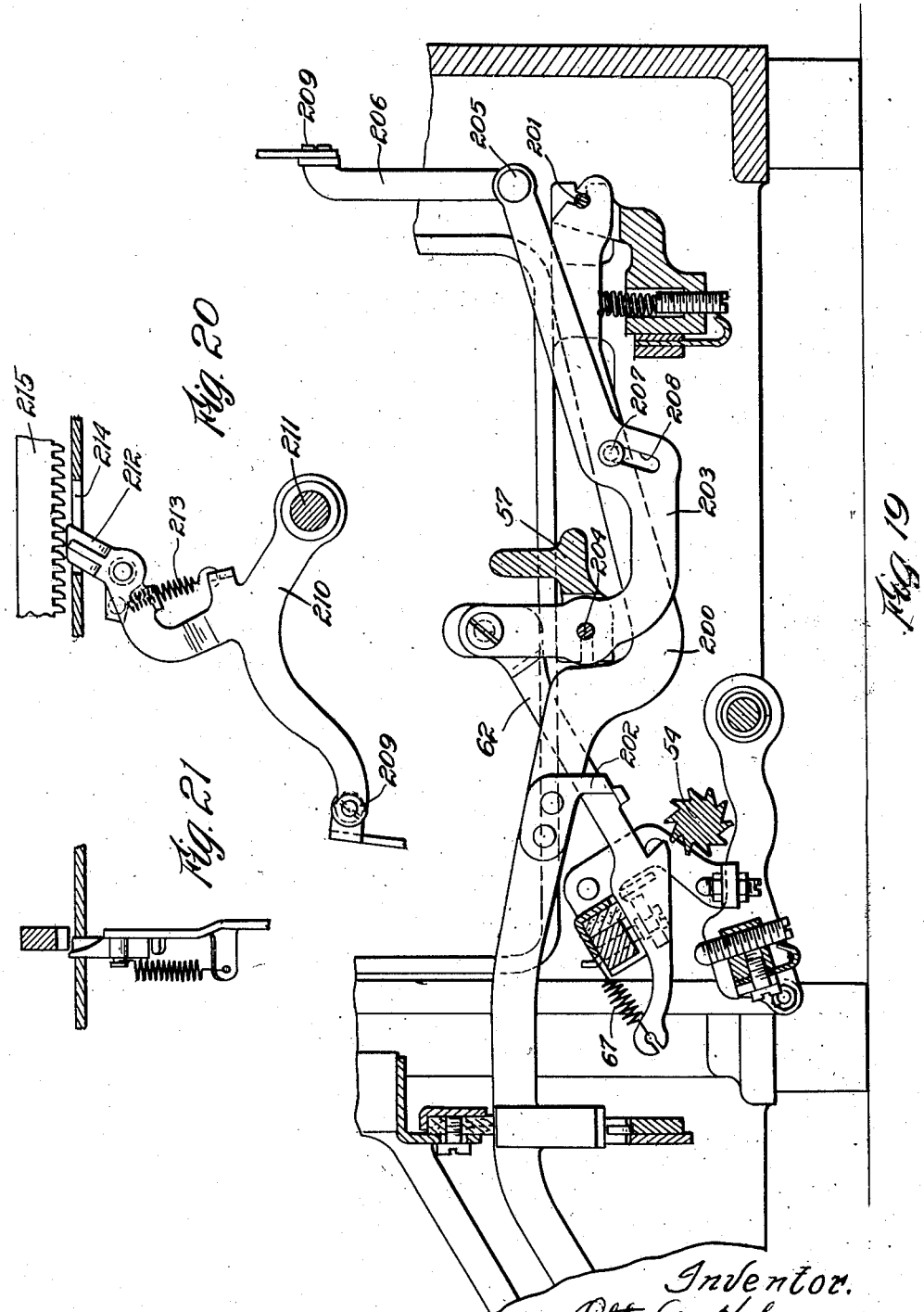

Patented Jan. 18, 1927.

1,614,475

UNITED STATES PATENT OFFICE.

OTTO A. HOKANSON, OF WOODSTOCK, ILLINOIS, ASSIGNOR TO WOODSTOCK TYPEWRITER COMPANY, OF WOODSTOCK, ILLINOIS, A CORPORATION OF ILLINOIS.

POWER-ACTUATED TYPEWRITER.

Application filed August 18, 1924. Serial No. 732,615.

This invention relates to typewriting mechanism having a motor drive and has for its object the provision of such mechanism in which a single driving element may be controlled by a standard keyboard for actuating the various elements of the typewriter.

The invention is exemplified in the combination and arrangement of parts shown in the accompanying drawings and described in the following specification, and it is more particularly pointed out in the appended claims.

In the drawings—

Fig. 1 is a somewhat fragmentary vertical sectional view through a typewriter showing the manner of actuating the type bars in accordance with the present invention;

Fig. 2 is a fragmentary elevation looking from the left in Fig. 1;

Fig. 3 is a fragmentary view showing a modified form of a part of the mechanism illustrated in Fig. 1;

Fig. 4 is a fragmentary horizontal section of a typewriter having the present invention applied thereto;

Fig. 5 is a fragmentary vertical section through a typewriter frame showing the interlocking mechanism employed in the present invention;

Fig. 6 is an elevation of a portion of the interlocking mechanism;

Fig. 7 is a section on line 7—7 of Fig. 6;

Fig. 8 is a fragmentary vertical section showing a portion of the control mechanism for the power actuated members;

Fig. 11 is a view similar to Fig. 1 showing the case shift actuator:

Fig. 12 is a fragmentary section showing the shift lock;

Fig. 13 is a top plan view of a connection in the actuating link for the shift frame;

Fig. 14 is a view similar to Fig. 1 showing the actuator for the letter space mechanism;

Fig. 15 is a vertical section showing the rock shaft for the space mechanism;

Fig. 16 is a detail of the rock shaft connection;

Fig. 17 is a view similar to Fig. 1 showing the tabulator and line lock mechanism;

Fig. 18 is a fragmentary elevation of the connection between the line lock lever and margin stop;

Fig. 19 is a view similar to Fig. 1 showing the actuating connection for the back spacer mechanism; and Figs. 20 and 21 are details of the back spacer mechanism.

Figure 9:
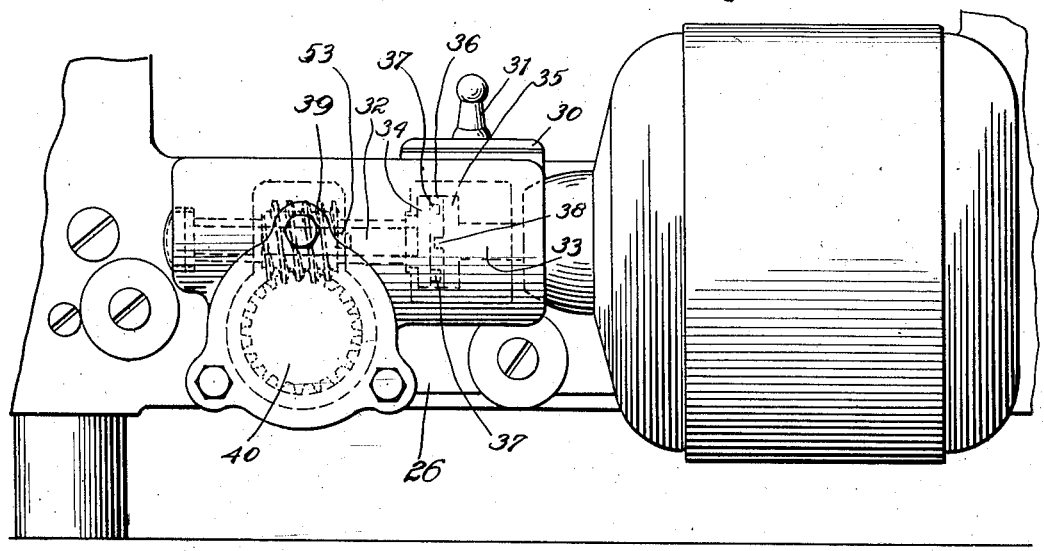
Fig. 9 is a side elevation showing the driving motor.
Figure 10:
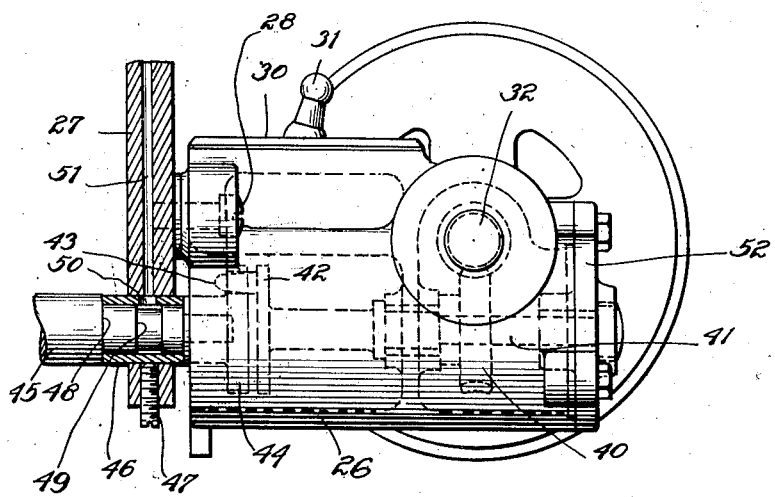
Fig. 10 is an end elevation of the motor drive with a portion of the frame in section.

As will be seen in Figs. 4, 9 and 10, a motor 25 is mounted on a suitable supporting bracket 26 secured to the side plate 27 of the typewriter frame by means of screws 28 and 29. A switch 30 having an operating lever 31 is provided for controlling the motor. A worm shaft 32 is journaled in the frame 26 in alinement with the motor shaft 33. Discs 34 and 35 are secured to the adjacent ends of the shaft 32 and 33, respectively, and a disc 36 of flexible material, such as leather, is interposed between the adjacent faces of the discs 34 and 35. Diametrically opposite pins 37 are formed on the disc 34 and extend into perforations in the disc 36. Similar pins 38 are formed on the disc 35 and enter the disc 36 from the side thereof opposite the pins 37. The pins 37 are offset angularly relative to the pins 38 so that a driving connection is provided between the shafts 32 and 33 which will permit operation even though the alinement of the shafts is not absolutely accurate. A worm 39 is secured to the shaft 32 and drives a worm wheel 40 secured to a shaft 41 arranged at right angles to the shaft 32 and journaled in the bracket 26. A disc 42 is secured to the end of the shaft 41 and carries a pin 43 which projects somewhat loosely into an opening in a disc 44 secured to the end of a shaft 45 journaled in the side frame 27. This will permit a driving connection between the shafts 41 and 45 which will provide allowance for a slight inaccuracy in the alinement of the two shafts. A bushing 46 is supported in the side frame 27 and is held in adjusted position by a set screw 47. The bushing 46 bears against a shoulder 48 on the shaft 45 so that the shaft 45 may be held against longitudinal displacement, the bushing 46 being adjustable to adjust the shaft in a longitudinal direction. A peripheral groove 49 is formed in the portion of the shaft 45 within the bearing 46 to facilitate oiling. An opening 50 extends through the bushing 46 and registers with an oil duct 51 in the frame plate 27. It is noted that the opening 50 is larger than the diameter of the duct 51 so that adjustment of the bushing 46 will not destroy the alinement between the opening and the oil duct. The bracket 27 is provided with a grease chamber which encloses the worm 32 and worm wheel 40, the chamber being closed by a plate 52. In order that the grease from the chamber may lubricate the shaft 32 a groove 53 is cut in the portion of the bearing wall adjacent the end of the worm 32 so that the worm will not exclude the grease from the bearing for the shaft 33. The shaft 46 carries an actuator cylinder or power drive 54 extending across the typewriter frame from the side 27 to the opposite side 55, the end of the shaft opposite the motor being journaled in the side member 55, as shown in Fig. 4. The periphery of the drum 54 is provided with longitudinally extending peripherally spaced teeth 56.

As shown in Figs. 1 and 4, a bar 57 extends transversely of the typewriter frame and has a plurality of sub-levers 58 pivoted at 59 thereon. The sub-levers 58 are connected with type bars 60 in the usual manner to operate the bars when the levers are swung forwardly upon their pivots 59. Connected to each of the sub-levers 58 by a screw 61 is an actuator 62 having a tooth 63 thereon arranged to engage the teeth 56 on the power driven cylinder 54. The actuators 62 are provided at their pivotal points with enlargements 64 and the connecting screw 61 connects the enlargements 64 and the sub-levers 58 at varying distances from the pivot 59 depending upon the length of the particular sub-lever involved. These levers vary in length in order to accommodate themselves to the different positions of the type bars 60 on the type bar segment. The variation in the position of the pivot screws 61 compensates for the difference in length of the sub-levers 58 so that uniform movement of the actuator 62 will impart the same amount of movement to the various type bars 60 irrespective of the length of the particular sub-levers involved. Each of the actuators 62 is provided with a forwardly projecting arm 65 having an opening 66 therein for receiving a spring 67, the opposite end of each spring 67 being secured to a connecting clip 68 formed on the upper flange 69 of a guide comb 70. The comb 70 is provided with slots 71 for guiding the actuators 62 in their longitudinal movement imparted to them by the power drive 54. The spring 67 normally holds the actuator 62 in its upper retracted position with the type bars 60 in their forward inoperative position. The comb 70 is mounted on a bar 72 extending transversely of the typewriter frame and adjustably supported at its opposite ends by screws 73 which engage slots in flanges 74 carried by brackets 75 secured to the sides of the typewriter frame by screws 76. A cushioning member 77 may be clamped between the bar 72 and the comb 70 for engaging the upper edges of the actuators 62. An arm 78 is secured to a rock shaft 79 at each side of the machine frame and a transverse bar 80 connects the forward ends of these arms. A series of adjustable screws 81 is carried by the bar 80, each screw being in registration with the lower inclined face 82 of one of the actuators 62. Spring tongues 83 are provided for holding the screws 81 in adjusted positions. The bar 80 with its screws 81 may be swung upwardly by means of a link 84 having its lower end pivoted at 85 to the front end of the bar 78 and having its upper end pivoted at 86 to a link 87. The link 87 is provided with a slot 88 engaging a pivot 89 on a bracket 90 secured to the top plate 91 of the typewriter frame. A spring 92 normally holds the link 87 in its rearmost position with a pin 93 thereon extending into one of a plurality of openings 94 in a plate 95 secured by screws 96 to the top frame 91. The plate 95 and bracket 90 may be formed integral with a supporting plate 97 through which the screws 96 extend. The forward end of the link 87 is bent to form a flange 98 to which the pin 93 and a finger piece 99 are attached. It will be apparent that the link 87 may be shifted upwardly or downwardly by first drawing it forwardly to release the pin 93 from the opening 94 and then move the finger piece 99 to any desired position. The movement of the link 87 will shift the arm 78 to bring the screws 81 to different heights relative to the actuators 62. Each actuator 62 is provided with a laterally extending lug 100 which registers with a contact member 101 pivoted at 102 to a corresponding key lever 103. Each contact member 101 is provided with a stop finger 104 in the rear of the lug 100 thus providing a notch at the lower end of the contact member for engaging the lug 100. The upper portion of the contact member 101 is provided with an offset portion 105 having a slot 106 therein which engages a screw 107 on the key lever 103 to limit the pivotal movement of the contact member about its pivot 102. A spring 108 normally holds the lower portion of the contact member 101 in its extreme forward position, but permits the contact member to rock about the pivot 102 in a counterclockwise direction, as viewed in Fig. 1.

When the key lever 103 is depressed it will force the actuator 62 downwardly until the tooth 63 engages one of the teeth 56 on the rotating power drum 54. This will move the actuator 62 forwardly and downwardly in a longitudinal direction until the bevel face 82 strikes the registering screw 81 whereupon the actuator will be forced upwardly out of engagement with the tooth 56. The forward and downward movement of the actuator will swing the sub-lever 58 about its pivot 59 and thus operate the type bar 60. The contact between the power drive 54 and the actuator 62 will continue for a portion only of the operation of the type bar. After the tooth 63 is disengaged from the tooth 56 the movement of the parts will complete the stroke of the type bar. The force of the blow may be regulated by positioning the screw 81 so as to time the disengagement of the teeth 56 and 63. If a light stroke is desired the finger piece 99 will be set opposite the upper designation character 109, Fig. 2. This will cause the screw 81 to disengage the teeth 56 and 63 after a short period of contact so that the type bar will strike lightly upon the platen. If a medium impression is desired the finger piece 99 will be moved downwardly to a central position, and if a heavy stroke is required the finger piece will be moved to the lower position. The force of the various type bars may be individually adjusted by regulating the positions of the screws 81 relative to the bar 80. After the actuator 62 has been released from the power drive 54 it will be drawn upwardly and rearwardly by the spring 67 so that in case the key lever is depressed the projection 100 will strike the forward edge of the contact member 101. Since the contact member 101 is yieldingly held in position this will not prevent return of the type bar to normal position, but on the contrary the spring 108 will yield to the force of the spring 67 and the contact member 101 will be rotated about its pivot 102. As soon as the key lever is released the lower end of the contact member 101 will spring forwardly until it engages the upper face of the lug 100, the rearward movement of the actuator 62 being limited by the stop finger 104. Thus at each depression of the key lever the power drive 54 will cause a single operation of the type bar 60 which will then return to its inoperative position and remain in this position until a second actuation of the key lever.

The key levers 103 are pivoted on a cross-bar 110 adjacent the rear of the machine frame in the usual manner. A guide plate 111 is supported adjacent the front of the typewriter frame by means of lugs 112 and screws 113. The plate 111 is provided with a series of slots 114 to form a guide comb for the key levers 103. Each key lever 103 is provided with a downwardly extending shoe 115 which travels in its corresponding slot 114 and is beveled at its lower end, as shown at 116. A retaining plate 117 is secured to the rear face of the guide plate 111 by screws 118 which extends through slots 119 in the plate 111 thus permitting vertical adjustment of the retaining plate relative to the guide plate. The retaining plate 117 is provided with a longitudinal groove 120 for receiving roller discs 121. Limit stops 122 are adjustably held to the retainer plate 117 to limit the movement of the rollers 121 in the runway 120. When one of the key levers is depressed its corresponding shoe 115 will move into contact with the rollers 121 and force the rollers apart so that it will be impossible to depress another key lever until the first key lever is released. In this way an interlocking mechanism is provided which prevents actuation of more than one of the type bars at a given time.

In Fig. 3 there is shown a slightly different arrangement of the connection between the key lever 103 and the actuator 62. In the form there shown the contact member 101 is rigidly secured to the key lever 103 by rivets 123. The lug 100 on the actuator 62 is carried by a bell crank 124 pivoted at 125 and provided with a spring 126 to hold it in position. The operation is very similar to the form shown in Fig. 1, except that on return movement of the actuator 62 the lug 100 will yield instead of the contact member 101.

In Figs. 11, 12 and 13 mechanism is shown by which case shift mechanism may be actuated from the power drive 54. Shift levers 127 are provided, one at each side of the machine, the levers being pivoted on the cross-bar 110 in the same manner as the type keys. Each lever 127 is provided with a contact member 101 engaging a lug 100 on an actuator 62 in the same manner described in connection with the type keys. The actuator 62 instead of being pivoted to a sub-lever, however, is pivoted to a rocker arm 128, the arm being pivotally mounted at 129 in alinement with the sub-lever pivots. A link 130 is pivotally connected at 131 to the arm 128 and extends upwardly and rearwardly, the rear end of the link being pivoted at 132 to an arm 133 on a platen shift frame 134. The platen shift frame 134 is pivoted at 135 and carries the shift rail 136 at its forward edge. A roller 137 travels on the rail 136 in the usual manner and is connected by a bracket 138 with the platen carriage, not shown. The link 130 is formed in two sections connected to one another by screws 139 and 140 extending through slots 141 and 142, respectively. The lower portion of the link 130 is provided with a lug 143 in which an adjustable screw 144 is mounted for bearing on the screw 140. Thus the adjustable screw 144 limits the extension of the link 130 but permits the parts of the links to be telescoped toward one another. The shift lever 127 is provided with an upwardly projecting arm 145 having a pin 146 extending somewhat loosely in an opening 147 formed in a detent 148. The detent 148 is pivoted at 149 to the side of the typewriter frame. The upper face of the detent 148 normally bears against the lower end of a contact block 150 adjustably secured by screws 151 to the platen shift frame 134. When the shift lever 127 is depressed the first movement will bring the actuator 62 into engagement with the power drive 54 and cause the arm 128 and the link 130 to be moved forwardly. Sufficient play is provided between the parts 146 and 147 to permit this operation of the actuator 62. The forward movement of the link 130 will swing the shift frame 134 about its pivot 135 so that as soon as the contact member 150 moves away from the top face of the detent 148, the shift lever 127 is free to move downwardly, thus throwing the detent 148 upwardly in the rear of the contact member 150. As long as the shift lever is held in its depressed position the detent 148 will remain in the rear of the contact member 150 and thus retain the shift frame in its uppermost position although the actuator 62 will have become disengaged from the drum 54 and be returned to its upper retracted position. The slots 141 and 142 will permit the return of the actuator 62 although the contact member 101 may not be spring-held to the shift lever 127 as in the case of the type keys. The shift key lever 127 is provided with a shift lock shown in Fig. 12. This consists of a key lever 152 pivoted at 153 on the lever 127 and provided with a hook 154 for engaging a latch member 155 secured to the guide plate 111. A spring 156 normally retracts the hook 154 but when the lock lever 152 is depressed the hook will engage the stop 155 and hold the shift key in depressed position. It may be released by pressing the key lever 127 whereupon the spring 156 will retract the hook 154.

In Figs. 14, 15 and 16 there is shown the connection for actuating the escapement controlled by the space bar. In this case the actuator 62 is connected to an arm 157 similar to the arm 128. The arm 157, however, is provided with an extension 158 connected by a link 159 to a crank 160 secured to a rock shaft 161. The rock shaft 161 is journaled in bearings 162 supported from the cross-bar 57 and the shaft extends from near the right-hand side of the machine to adjacent the center. Near the center of the machine a second arm 163 is secured to the shaft 161 and is pivotally connected to a link 164. The link 164 at its rear end is attached to a tailpiece 165 extending downwardly from the dog rocker for the escapement mechanism. The escapement mechanism itself is not shown but may be of the form in my application, Serial No. 712,181. The link 159 may be provided with a slot 166 where it is connected with the arm 160 so as to provide a slight lost motion between the actuator 62 and the link 164. The actuator 62 is provided with a contact member 167 for pressing the actuator into operative relation with the rotor 54. The contact member 167 is carried on a space lever 168 which is secured to a rock shaft 169, as shown in Fig. 4. A second space lever 170 at the opposite side of the machine is also attached to the rock shaft 169, the two being connected to the space bar at the front of the machine, not shown. Springs 171 hold the space bar in its uppermost position, the springs being supported by brackets 172 secured to the rear cross-bar 110. The actuator 62 is provided with a disconnecting screw 173 which is supported on an arm 174 projecting from the bracket plate 75. It will thus have been seen that the disconnecting member for the space bar is independent of the adjustment of the cross-bar 80. The reason for this will be apparent since the space bar has nothing to do with the force of the impression imparted to the type.

In Fig. 17 there is shown line lock mechanism controlled by a margin stop 175 shown in Fig. 18. The stop 175 is carried on a cross-bar 176 secured to the carriage of the machine in a well-known manner. The stop engages a lever 177 when the carriage approaches the end of its travel. The lever 177 is pivoted to a link 178 which operates a bell crank 179, Fig. 17. The bell crank 179 is connected with a link 180 which extends toward the front of the machine and is provided at its forward end with an L-shaped slot 181. The slot 181 engages a pivot pin 182 carried by a rocker 183 pivoted at 184 to the side of the machine frame. A spring 185 normally holds the rocker 183 in a clockwise direction, as viewed in Fig. 17. The rocker 183 has an offset portion 186, see also Fig. 4, which carries a shoe 187 in position to engage the rollers 121 of the key interlocking mechanism. When the stop 175 strikes the lever 177 and moves the link 181 forwardly it will move the rocker 183 about its pivot 184 and carry the shoe 187 into engagement with the rollers 121, thus making it impossible to depress any of the keys until the shoe is released. If it is desired to release the line lock mechanism for further writing this may be done by depressing the release key 188. This key is pivoted at 189 on the side of the machine frame and carries a forwardly projecting arm 190 having a lug 191 projecting beneath the link 180. A spring 192 normally holds the arm 190 in its lower position and also draws the link 180 rearwardly, one end of the spring being attached to a lug 193 on the link 180. When the release key 188 is depressed the arm 190 will raise the link 180 to bring the horizontal portion of the slot 181 into registration with the pin 182. This will permit the spring 185 to swing the rocker 183 rearwardly and raise the shoe 187 out of engagement with the interlocking rollers 121. When the lever 177 is released from the stop 175 the link 180 will again be moved rearwardly by the spring 192, thus bringing the pin 182 into registration with the vertical portion of the slot 181 so that the parts are returned to their normal position.

Fig. 17 also shows a tabulator key 194 which is pivoted at 195 in alinement with the type keys and is provided with a link 196 connecting it with tabulator stop mechanism in the usual manner. An actuator 62 for the tabulator key is provided which is controlled by a contact member 197. The actuator 62 for the tabulator key is connected by a link 198 with the escapement mechanism so that when the actuator 62 is moved, the escapement mechanism will be operated to release the carriage.

Power-operated back spacing mechanism is shown in Figs. 19, 20, and 21. A back spacing key 200 is pivoted at 201 in alinement with the type keys. This key lever is provided with a contact member 202 for forcing the corresponding actuator 62 into cooperative engagement with the drive 54. A lever 203 is pivoted at 204 on the crossbar 57, the actuator 62 being pivoted to one end of the lever while the other end extends rearwardly and is pivotally connected at 205 with an upwardly extending link 206. A guide pin 207 on the lever 200 cooperates with the slots 208 in the lever 203 to hold the two levers in operative relation. The upper end of the link 206 is pivoted at 209 with a bracket 210 which is pivotally mounted at 211 on the machine frame. The upper end of the bracket 210 has a pawl 212 pivoted thereon and held in upright position by a spring 213. The pawl 212 projects through an opening 214 in the rear portion of the top plate into position to engage the rack 215 on the platen carriage. It will be seen that upon depression of the back spacer lever 200 the actuator 62 will be moved to raise the bracket 210 which will carry the pawl 212 into contact with the rack 215 and move the rack backwardly one space. After each operation the bracket 210 will be returned to its normal position shown in Fig. 20 by means of the spring 67 connected with the actuator 62. This will withdraw the pawl 212 from the rack 215 so as not to interfere with the normal operation of the escapement mechanism.

A suitable stop or cushion 216 is supported by a bar 217 above the key levers and secured thereto by a plate 218 and screws 219 to arrest the upward movement of the levers, as shown in Fig. 1. Some of the levers such as the space levers, the case shift levers, the tabulator levers and the line lock levers do not cooperate with the interlocking discs 121, and separate adjustable stops shown at 220, Fig. 5, may be provided for these levers.

A suitable cushion stop 221, Fig. 1 is provided for limiting the upward movement of the actuators 62.

I claim:—

1. In a typewriter, type bar actuating mechanism, letter spacing mechanism separate from said type bar actuating mechanism, a common drive for said type bar actuating mechanism and said letter spacing mechanism, keys for selectively connecting said mechanisms with said drive, and adjustable means for controlling said type bar actuating mechanism to regulate the impression made thereby, said adjustable means operating independently of said letter spacing mechanism.

2. In a typewriter, a power drive, type bars, actuators for connecting said power drive with said type bars, means for disconnecting said actuators from said power drive, a common device for adjusting said disconnecting means, a separate actuator independent of said type bars, and means for disconnecting said separate actuator from said power drive independently of the disconnecting means for said type bar actuators.

3. In a typewriter, a power drive, a plurality of type bars, actuators for said type bars, keys for selectively connecting said actuators with said power drive, adjustment screws for disconnecting said actuators from said power drive, a common support for said adjustment screws, and means for shifting said common support to move said adjustment screws in unison with one another.

4. In a typewriter, a power drive, a plurality of type bars, actuators for connecting said power drive with said type bars, separate adjustment screws for each of said actuators to disconnect said actuators from said power drive, a common support for said adjustment screws, means for shifting said common support, an actuator separate from said type bar actuators, and an adjustment screw mounted independently of said common support for disconnecting said last-mentioned actuator from said power drive.

5. In a typewriter, a plurality of type bars, actuators for said type bars, a power drive, key levers for selectively connecting said actuators with said power drive, letter space mechanism independent of said type bars, an actuator for said letter space mechanism, a space lever for connecting said letter space actuator with said power drive, tabulator mechanism, an actuator therefor, a tabulator key for connecting said tabulator actuator with said power drive, back space mechanism, an actuator therefor, and a back space key for connecting said back space actuator with said power drive, the actuators for said letter-space mechanism, said tabulator mechanism and said back space mechanism all being arranged to transmit force to the parts operated thereby independently of their respective controlling levers.

6. In a typewriter, a plurality of type bars, actuators for said type bars, a power drive, key levers for selectively connecting said actuators with said power drive, letter space mechanism independent of said type bars, an actuator for said letter space mechanism, a space lever for connecting said letter space actuator with said power drive, tabulator mechanism, an actuator therefor, a tabulator key for connecting said tabulator actuator with said power drive, back space mechanism, an actuator therefor, a back space key for connecting said back space actuator with said power drive, adjustment screws for disconnecting said type bar actuators from said power drive, means for shifting said adjustment screws in unison with one another to vary the force imparted to said type bars, and means independent of said adjustment screws for disconnecting said letter space actuator and said case shift actuator from said power drive.

7. In a typewriter, a plurality of type bars, actuators for said type bars, a power drive, key levers for selectively connecting said actuators with said power drive, letter space mechanism independent of said type bars, an actuator for said letter space mechanism, a space lever for connecting said letter space actuator with said power drive, tabulator mechanism, an actuator therefor, a tabulator key for connecting said tabulator actuator with said power drive, back space mechanism, an actuator therefor, a back space key for connecting said back space actuator with said power drive, adjustment screws for disconnecting said type bar actuators from said power drive, a common support for said adjustment screws, means for moving said support to move said adjustment screws in unison with one another to vary the force of the blows imparted to said type bars, adjustment screws for disconnecting said letter space actuator and said case shift actuator from said power drive, and a fixed support for said last-named adjustment screws.

8. In a typewriter, a plurality of type bars, actuators for said type bars, a power drive for said actuators, means for disconnecting said actuators from said power drive, means for adjusting said disconnecting means to regulate the impression made by said type bars, said adjusting means comprising a hand lever pivotally and slidably mounted on said typewriter, and an index member cooperating with said hand lever and having means thereon for retaining said hand lever in a plurality of adjusted positions.

9. In a typewriter, a type bar, a longitudinal movable actuator for said type bar, a power drive for said actuator, a key lever, a contact member mounted on said key lever and having limited pivotal movement thereon, said contact member having a stop for limiting the movement of said actuator in one direction relative to said contact member and having a contact portion for moving said actuator in a transverse direction into engagement with said power drive, means for disconnecting said actuator from said power drive, a spring for returning said actuator to its normal position, said contact member being held by said key lever when depressed, in the return path of said actuator, and a spring connected with said contact member for holding said contact member in operative position on said key lever but permitting said contact member to yield to said actuator when said actuator engages said contact member on return movement thereof.

10. The combination with a typewriter frame member, of a bushing mounted in said frame member, said frame member having an oil duct therein registering with an opening in said bushing, the opening in said bushing being of greater size than the transverse dimensions of said oil duct, a power drive for said typewriter journaled in said bushing and having a shoulder engaging the end thereof, and means for holding said bushing in longitudinally adjusted positions in said frame.

11. In a typewriter, a power drive, a plurality of type bars, key-controlled type bar actuating means for selectively connecting said type bars with said power drive, adjustable means for regulating the connection between said power drive and type bar actuating means, letter space mechanism independent of said type bars, actuating means for said letter space mechanism, and means for regulating the connection between said last-named actuating means and said power drive independently of the regulating means for said type bar actuating means.

In testimony whereof I have signed my name to this specification on this 15th day of August, A. D. 1924.

OTTO A. HOKANSON.